United States Patent

[11] 3,630,470

[72] Inventor Frederick Thomas Elliott
    Paze Inc. APO 96307, San Francisco, Calif.
[21] Appl. No. 11,066
[22] Filed Feb. 13, 1970
[45] Patented Dec. 28, 1971

[54] VERTICAL TAKEOFF AND LANDING VEHICLE
    10 Claims, 5 Drawing Figs.
[52] U.S. Cl. .................................................. 244/21,
    244/12 C, 244/23 C
[51] Int. Cl. ..................................................... B64c 27/00
[50] Field of Search ............................................ 244/10, 19,
    21, 12, 23, 42.50

[56] References Cited
    UNITED STATES PATENTS
    1,432,787  10/1922  Reyes ............................ 244/12
    2,417,358   3/1947  Grose ............................ 244/21
    3,071,334   1/1963  Barnes ........................... 244/23

*Primary Examiner*—Milton Buchler
*Assistant Examiner*—Steven W. Weinrieb
*Attorney*—Mallinckrodt & Cornaby

ABSTRACT: A vertical takeoff and landing vehicle utilizing the Magnus effect to lift the vehicle vertically through a fluid medium, usually air but conceivably other gaseous atmospheres as well as water. A plurality of horizontal, rotatable cylinders are arranged, preferably in opposite pairs, about the surface of a normally horizontal support member near the perimeter thereof. Drive means are provided for rotating the cylinders simultaneously in an upward and outward direction toward the periphery of the support member. A cover member is disposed above the cylinders to define a plenum chamber therewith. The cover member has a center aperture provided with means to draw a stream of fluid into the plenum chamber and force it laterally across the upper and lower surfaces of the rotating cylinders. If desired, drive means can be provided for moving the vehicle in a lateral direction.

Patented Dec. 28, 1971
3,630,470
2 Sheets-Sheet 1
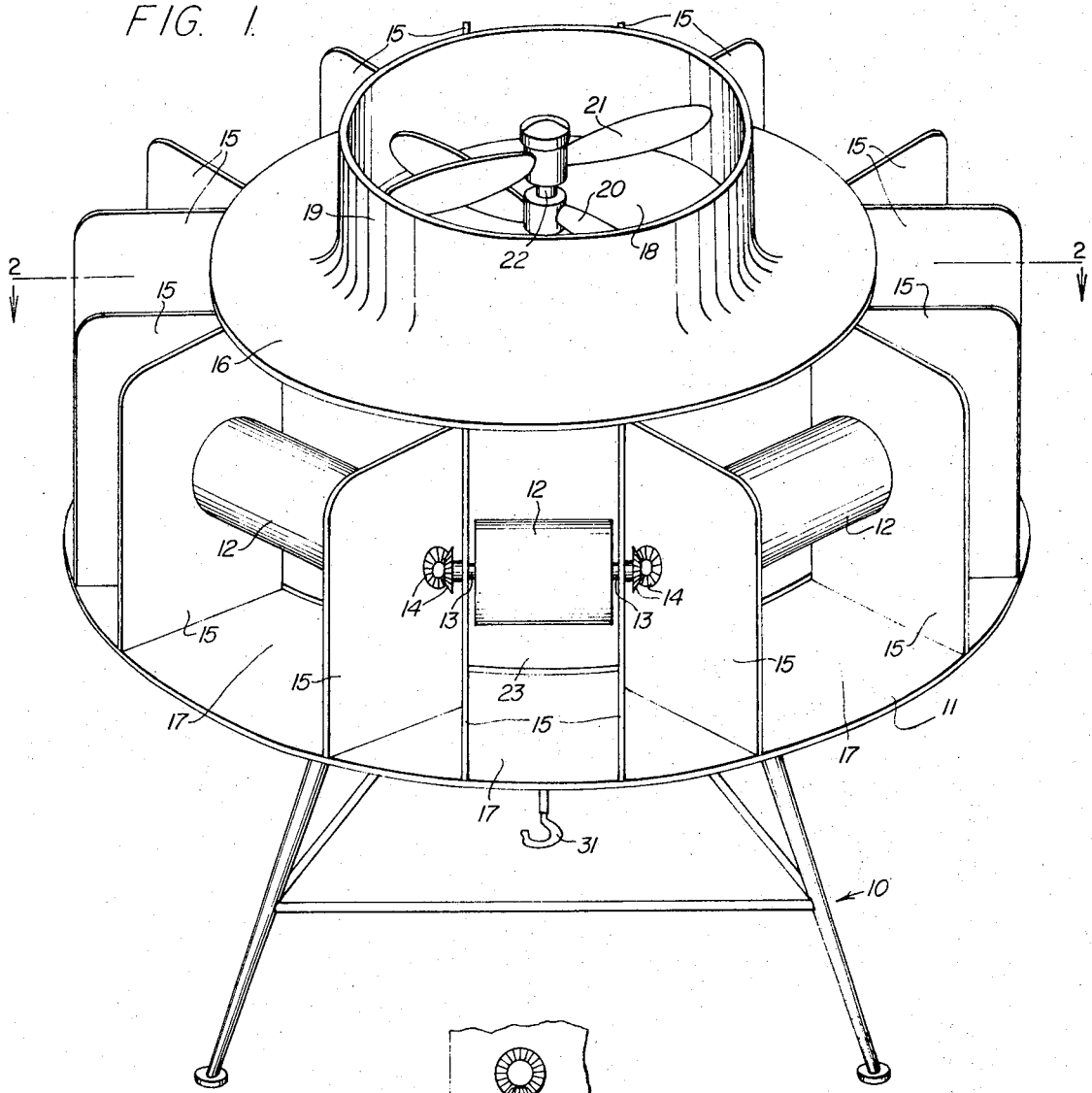
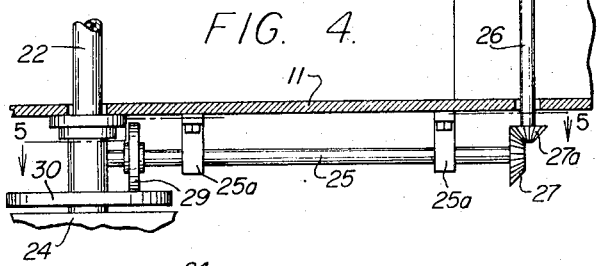
INVENTOR.
FREDERICK THOMAS ELLIOTT
BY
Mallinckrodt & Connoly
ATTORNEYS

INVENTOR.
FREDERICK THOMAS ELLIOTT

ATTORNEYS

VERTICAL TAKEOFF AND LANDING VEHICLE

BACKGROUND OF THE INVENTION

1. Field

This invention relates to vehicles for vertical takeoff and landing utilizing the Magnus effect in a fluid medium.

2. State of the Art

The Magnus effect is based upon the observation that a lateral fluid flow, such as an air current, striking a rotating horizontal cylinder causes a buoyant or lifting effect on the cylinder. The buoyant effect is due to reduction of pressure on the upper portion of the rotating cylinder by reason of an increase in the velocity of the airstream flowing over such upper portion when the skin convection current thereover is in the same direction as the airstream. The velocity of the airstream flowing along the underside of the rotating cylinder is correspondingly less, since the underside skin convection current is in opposition to such airstream. The net effect is a reduced pressure on the upper portion of the cylinder.

Numerous attempts have been made to utilize this principle in propelling aircraft and marine vehicles. Examples have been documented in the following patents: 1,779,054; 1,845,616; 2,065,254; 1,820,919; 2,344,515; and 2,985,406. However, to date no known attempt has been commercially successful.

3. Objectives

It was an objective in the development of this invention to provide a vehicle capable of taking off and landing vertically in a fluid medium, utilizing the Magnus effect for the purpose.

SUMMARY OF THE INVENTION

The vehicle of the invention utilizes the Magnus effect to provide vertical takeoff and landing capability coupled with the ability to hover in a fluid medium, such as air or water, for sustained periods of time. The vehicle includes a plurality of rotatable cylinders mounted on horizontal axes and disposed near the perimeter of a supporting surface which is usually horizontal when in operation. The cylinders are preferably arranged annularly in opposite pairs about the support surface. Drive means are provided for simultaneously rotating the cylinders in an upward and outward direction toward the periphery of the supporting surface. Disposed above the cylinders is a cover member, which completes the enclosure of a plenum chamber between the supporting surface and the cylinders. The member has an aperture at its center, which accommodates means for drawing a stream of the fluid medium downwardly into the plenum chamber and laterally across the upper and lower surfaces of the cylinders. This creates a reduced pressure on the upper surfaces of the cylinders and causes a lifting effect on the vehicle. By varying the relative velocities of rotation of the cylinders and of the incoming fluid medium, the vehicle can be made to rise vertically and hover for an indefinite period of time.

It is preferred to provide a downwardly and outwardly diverging member at the center of the supporting surface to divert the incoming fluid stream laterally over the upper and lower surfaces of the cylinders. If desired the vehicle can be provided with drive means for lateral movement of the vehicle in the fluid medium.

DESCRIPTION OF THE DRAWINGS

A construction constituting what is presently regarded as the best mode of carrying out the invention is illustrated in the accompanying drawings, in which:

FIG. 1 is a view in perspective of the vehicle looking from one side thereof;

FIG. 4, a fragmentary vertical section taken along the line 4—4 of FIG. 2 to show the drive mechanism; and FIG. 5, a fragmentary horizontal section taken along the line 5—5 of FIG. 4.

DETAILED DESCRIPTION OF THE ILLUSTRATED EMBODIMENT

Figure 2:
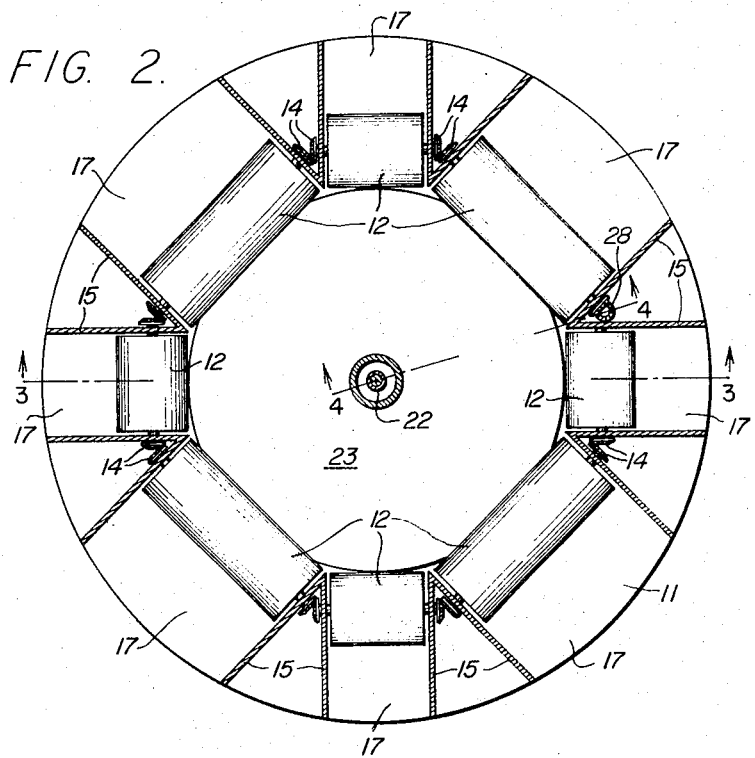
FIG. 2, a horizontal section taken along the line 2—2 of FIG. 1.

In the illustrated embodiment, the vehicle is intended to operate in air as the fluid medium. The supporting surface of the vehicle comprises a disc-shaped member 11 which preferably rests in a horizontal position upon a support structure 10. The support structure 10 is illustrated as being in the form of a tripod; however, any other form of support structure can be employed consistent with the type of terrain upon which the apparatus is to be used. For example, if the vehicle is to be used on water, in swamps, snow, or the like, the support structure 10 can be provided with pontoons, oversized wheels, or skiis. The supporting disc 11 can be fabricated of any suitable material, e.g., a light metal, plastic or the like, but the material must be capable of withstanding the pressure of high-velocity airstreams.

Eight rotatable cylinders 12 in this embodiment are mounted on horizontal axes 13 and are disposed in opposite pairs, in end-to-end relationship, annularly about the supporting disc 11. The cylinders 12 preferably have a roughened surface to increase the skin convection current as they rotate simultaneously at the same velocity in an upward and outward direction. The direction of rotation causes the skin convection current to flow from the upper sides of the cylinders 12 toward the periphery of the supporting disc 11. The arrangement of the cylinders in opposite pairs provides stability and balance in the vehicle since each cylinder 12 in a pair rotates counter to the other, i.e., toward the periphery of the disc 11. This creates stabilizing, counterforces to prevent unintentional lateral drift of the vehicle from a true vertical course. There can be any number of cylinders 12 arranged around the perimeter of the supporting disc 11, but they are preferably arranged in opposite pairs to achieve the stabilizing effect. If the vehicle is to be used for lateral travel and is equipped with other means for achieving the lateral movement, the cylinders 12 can be arranged so as to lessen or remove any interference with the lateral travel of the vehicle. For example, the cylinders can be disposed in opposing pairs arranged parallel to the direction of lateral travel. The cylinders 12 are conveniently rotated simultaneously through a series of interconnected beveled gears 14 attached to each end of each cylinder 12 and rotated by a drive mechanism described in detail below.

It has been found advantageous to provide an upright air baffle or partition 15 at each end of each cylinder 12 to channel the incoming airflow directly over the rotating surfaces of the cylinders 12 and to prevent loss of air current over the ends of the cylinders 12.

Figure 3:
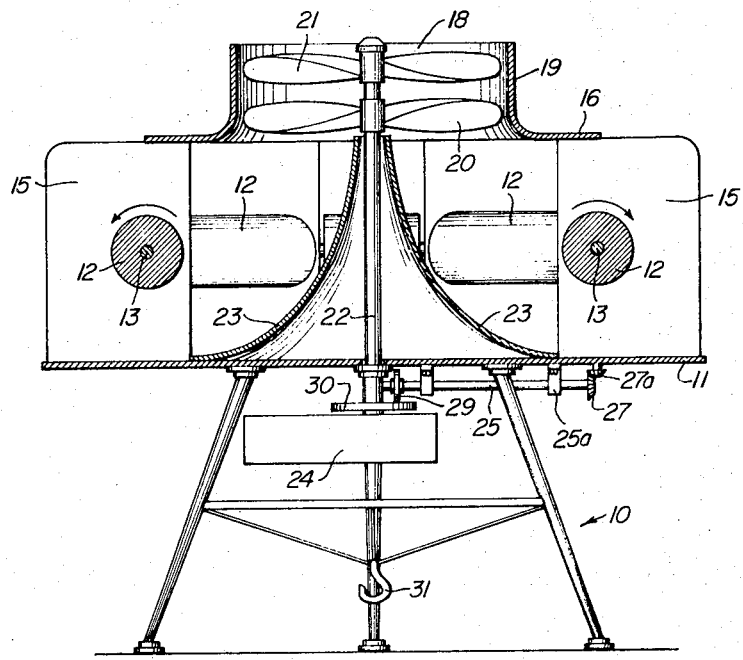
FIG. 3, a vertical axial section taken along the line 3—3 of FIG. 2.

Disposed above the cylinders 12 and attached to the upper ends of the baffles 15 is a cover member, here shown in the form of a disc 16 which is preferably smaller in diameter than the supporting disc 11 to permit a free flow of air over the upper surface of the cylinders 12 and to reduce the vacuum created on the underside of the cylinders 12. As shown in FIG. 3, the circumference of the covering disc 16 advantageously reaches approximately the outer circumferential edge of the cylinders 12. The space enclosed by the covering disc 16, the supporting disc 11, and the annular arrangement of the rotatable cylinders 12 defines a plenum chamber 17 which contains air under higher pressure than the surrounding atmosphere when the vehicle is in operation.

The cover disc 16 is provided with an annular aperture 18 in the center thereof. A tubular member 19 is preferably attached to the upper edge of the aperture 18 and extends upwardly above the covering disc 16. The tubular member forms a cylindrical channel through which the incoming air is drawn into the plenum chamber 17. As illustrated, a preferred means of drawing a stream of air into the plenum chamber 17 comprises two counterrotating horizontal propellers 20, 21 rotatably mounted within the tubular member 19. Although a single propeller 20 can be used, increased stability and higher airstream velocities are achieved through the utilization of two counterrotating propellers. In the illustrated embodiment, the propellers 20 and 21 are mounted on a vertical shaft 22 which extends downwardly to the drive mechanism disposed below the supporting disc 11. As a convenient means for changing the direction of the incoming airstream from a downward movement to a laterally directed movement over the surfaces of the cylinders 12, it is preferred to mount a downwardly and outwardly diverging air guide 23 in the center of the supporting disc 11. In the illustrated embodiment the air guide 23 is frustoconical in shape and is disposed about shaft 22.

Power to rotate propellers 20, 21 and cylinders 12 is provided by a drive mechanism which is here shown, FIGS. 4 and 5, as a motor 24 connected to propellers 20 and 21 by propeller shaft 22. Power to rotate cylinders 12 is supplied through a lateral drive shaft 25 which is rotatably mounted on the underside of supporting disc 11 by means of brackets 25a, and is rotatably connected at one end with a vertical shaft 26 through a pair of beveled gears 27 and 27a attached respectively to shaft 25 and shaft 26. Vertical shaft 26 transfers power from lateral shaft 25 to beveled gears 14 and cylinders 12 through the beveled gear 28 fixably attached to the upper end of shaft 26. The lateral drive shaft 25 is connected near its opposite end to motor 24 through a drive disc 29 attached to drive shaft 25. Drive disc 29 is in frictional contact at its outer circumferential edge with a clutch plate 30 mounted on vertical shaft 22. Drive disc 29 is adjustable along the length of drive shaft 25 to permit movement of the drive disc 29 across the face of revolving clutch plate 30 to increase or decrease the rotational velocity of cylinders 12. In this manner, the comparative velocities of propellers 20 and 21 and cylinders 12 can be adjusted to achieve maximum lifting power when desired.

The vehicle can be provided with a downwardly directed hook 31 attached to the support structure 10, so that the vehicle can be used to lift cargo into the air from virtually any surface.

In addition to its capacity for vertically taking off and landing, the vehicle can be provided with means for lateral movement to permit it to maneuver about in one location or to travel greater distances, such means being any one of the various conventional propulsion means.

I claim:

1. Vertical takeoff and landing vehicle, comprising:
    means defining a horizontal surface; a plurality of horizontal, rotatable cylinders disposed about the perimeter of the supporting surface;
    drive means for rotating the cylinders simultaneously in an upward and outward direction toward the periphery of the supporting surface;
    a cover member disposed above the cylinders, said cover member having an aperture in the center thereof, and forming a plenum chamber with the supporting surface and the cylinders;
    means for drawing a fluid stream downwardly through said aperture into the plenum chamber and forcing said stream laterally across the upper and lower rotating surfaces of the cylinders to create a lifting effect on the upper surface of the cylinders.

2. Vertical takeoff and landing vehicle as set forth in claim 1, wherein upwardly extending baffles are disposed at each end of each cylinder perpendicularly of the length of the cylinder.

3. Vertical takeoff and landing vehicle as set forth in claim 1, wherein said means for drawing a fluid stream into the plenum chamber comprise a horizontal, rotatable propeller and means for rotating said propeller.

4. Vertical takeoff and landing vehicle as set forth in claim 3, having two counterrotating propellers.

5. Vertical takeoff and landing vehicle as set forth in claim 3, having a tubular member extending upwardly from, and surrounding, said aperture in the cover member.

6. Vertical takeoff and landing vehicle as set forth in claim 1, having a downwardly and outwardly diverging member disposed in the center of the supporting surface for diverting the incoming fluid stream from downward movement to lateral movement outwardly over the upper and lower surface of the cylinders.

7. Vertical takeoff and landing vehicle as set forth in claim 1, wherein the cylinders are arranged in opposite pairs in end-to-end relationship around the supporting surface.

8. Vertical takeoff and landing vehicle as set forth in claim 1, wherein the perimeter of the cover member extends to approximately the outer periphery of the circumference of the cylinders.

9. Vertical takeoff and landing vehicle as set forth in claim 1, having driving means for lateral movement.

10. Vertical takeoff and landing vehicle as set forth in claim 1, wherein the fluid is air.

* * * * *